United States Patent
Nussbaum et al.

(10) Patent No.: US 7,421,308 B2
(45) Date of Patent: Sep. 2, 2008

(54) DIGITAL CONTROL SERVO SYSTEM

(75) Inventors: Michael B. Nussbaum, Newton, MA (US); Michael R. Shannon, Medford, MA (US); Frederick A. Stewart, Watertown, MA (US)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 11/627,631

(22) Filed: Jan. 26, 2007

(65) Prior Publication Data

US 2007/0239290 A1 Oct. 11, 2007

Related U.S. Application Data

(63) Continuation of application No. 09/957,788, filed on Sep. 21, 2001, now Pat. No. 7,200,464.

(60) Provisional application No. 60/234,405, filed on Sep. 21, 2000.

(51) Int. Cl.
*G05B 19/29* (2006.01)

(52) U.S. Cl. .................. 700/186; 700/56; 250/236; 318/600; 346/107.4

(58) Field of Classification Search ............... 700/186, 700/56; 318/600; 250/36, 234
See application file for complete search history.

(56) References Cited

U.S. PATENT DOCUMENTS 3,932,794 A 1/1976 Iwako
(Continued)

FOREIGN PATENT DOCUMENTS

CA 2359739 4/2003
(Continued)

OTHER PUBLICATIONS

Scanlab, Smart Scanning-inteliScan Aug. 10, 2003, SCANLAB America, Inc., Cincinnati, Ohio.

(Continued)

*Primary Examiner*—Lincoln Donovan
*Assistant Examiner*—Antony M. Paul
(74) *Attorney, Agent, or Firm*—Gauthier & Connors LLP

(57) ABSTRACT

A limited rotation motor optical scanning system is disclosed that includes a limited rotation motor scanner, a digital controller servo system, a position feedback unit, a wide angle compensation unit, a digital processor, and an adjustment unit. The limited rotation motor scanner element is adapted for directing an energy beam to at least one location within a field of view. The digital controlled servo system is adapted for controlling motion of the limited rotation motor scanner element in accordance with a servo command waveform. The position feedback unit is for providing a position feedback signal indicative of a rotational position of the limited rotation motor scanner element. The wide angle compensation unit is for receiving the position feedback signal and for providing a boost signal that is representative of a boost factor that compensates for torque constant variation with the rotational position of said limited rotation motor scanner element. The digital processor is for providing a set of control parameters for use during the command waveform in conformance with which the command waveform will be employed to control motion of the limited rotation motor scanner element. The adjustment unit is for providing an adjusted output signal responsive to the control parameters and responsive to the boost signal to control the motion of the limited rotation motor scanner element while compensating for torque constant variation with the rotational position of the limited rotation motor scanner element during the command waveform.

20 Claims, 13 Drawing Sheets

U.S. PATENT DOCUMENTS

| | | | |
|---|---|---|---|
| 3,999,043 A | 12/1976 | Reiss et al. |
| 4,151,567 A | 4/1979 | Dorsemagen et al. |
| 4,282,468 A | 8/1981 | Barker et al. |
| 4,398,241 A | 8/1983 | Baker et al. |
| 4,514,671 A | 4/1985 | Louth |
| 4,532,402 A | 7/1985 | Overbeck et al. |
| 4,536,806 A | 8/1985 | Louth |
| 4,624,368 A | 11/1986 | Satake |
| 4,631,605 A | 12/1986 | O'Gwynn |
| 4,646,280 A | 2/1987 | Toyosawa |
| 4,670,653 A | 6/1987 | McConkle et al. |
| 4,809,253 A | 2/1989 | Baas et al. |
| 4,845,698 A | 7/1989 | Baas |
| 4,864,295 A | 9/1989 | Rohr |
| 4,870,631 A | 9/1989 | Stoddard |
| 4,893,068 A | 1/1990 | Evans, Jr. |
| 4,903,131 A | 2/1990 | Lingemann et al. |
| 4,930,027 A | 5/1990 | Steele et al. |
| 4,956,831 A | 9/1990 | Sarraf et al. |
| 4,961,117 A | 10/1990 | Rumley |
| 4,965,513 A | 10/1990 | Haynes et al. |
| 4,972,344 A | 11/1990 | Stoddard et al. |
| 5,075,875 A | 12/1991 | Love et al. |
| 5,093,608 A | 3/1992 | Kono et al. |
| 5,119,213 A | 6/1992 | Graves et al. |
| 5,122,720 A | 6/1992 | Martinson et al. |
| 5,157,597 A | 10/1992 | Iwashita |
| 5,167,002 A | 11/1992 | Fridhandler |
| 5,185,676 A | 2/1993 | Nishiberi et al. |
| 5,187,364 A * | 2/1993 | Blais .................. 250/236 |
| 5,225,770 A | 7/1993 | Montagu |
| 5,229,574 A | 7/1993 | Stone |
| 5,257,041 A * | 10/1993 | Kresock et al. ......... 346/107.4 |
| 5,275,041 A | 1/1994 | Poulsen |
| 5,280,377 A | 1/1994 | Chandler et al. |
| 5,285,378 A | 2/1994 | Matsumoto |
| 5,293,102 A | 3/1994 | Martinson et al. |
| 5,313,147 A | 5/1994 | Yoneda et al. |
| 5,331,264 A | 7/1994 | Cheng et al. |
| 5,406,496 A | 4/1995 | Quinn et al. |
| 5,424,526 A | 6/1995 | Leonhardt et al. |
| 5,424,632 A | 6/1995 | Montagu |
| 5,452,285 A | 9/1995 | Monen |
| 5,453,618 A | 9/1995 | Sutton et al. |
| 5,534,071 A | 7/1996 | Varshney et al. |
| 5,537,109 A | 7/1996 | Dowd |
| 5,541,486 A | 7/1996 | Zoller et al. |
| 5,585,976 A | 12/1996 | Pham |
| 5,589,870 A | 12/1996 | Curry et al. |
| 5,600,121 A | 2/1997 | Kahn et al. |
| 5,604,516 A | 2/1997 | Herrod et al. |
| 5,610,487 A | 3/1997 | Hutsell |
| 5,646,765 A * | 7/1997 | Laakmann et al. .......... 359/202 |
| 5,653,900 A | 8/1997 | Clement et al. |
| 5,656,908 A | 8/1997 | Rehm |
| 5,699,494 A | 12/1997 | Colbert et al. |
| 5,726,883 A | 3/1998 | Levine et al. |
| 5,767,494 A | 6/1998 | Matsueda et al. |
| 5,801,371 A | 9/1998 | Kahn et al. |
| 5,805,448 A | 9/1998 | Lindsay et al. |
| 5,808,725 A | 9/1998 | Moberg et al. |
| 5,869,945 A | 2/1999 | Ha et al. |
| 5,886,335 A | 3/1999 | Matsueda |
| 5,886,422 A | 3/1999 | Mills |
| 5,912,541 A | 6/1999 | Bigler et al. |
| 5,914,924 A | 6/1999 | Takagi et al. |
| 5,986,989 A | 11/1999 | Takagi et al. |
| 6,054,828 A | 4/2000 | Hill |
| 6,072,653 A | 6/2000 | Goker |
| 6,107,600 A | 8/2000 | Kurosawa et al. |
| 6,144,011 A | 11/2000 | Moss et al. |
| 6,198,176 B1 | 3/2001 | Gillette |
| 6,198,246 B1 | 3/2001 | Yutkowitz |
| 6,211,484 B1 | 4/2001 | Kaplan et al. |
| 6,211,639 B1 | 4/2001 | Meister et al. |
| 6,211,640 B1 | 4/2001 | Fujisaki et al. |
| 6,243,350 B1 | 6/2001 | Knight et al. |
| 6,256,121 B1 | 7/2001 | Lizotte et al. |
| 6,275,319 B1 | 8/2001 | Gadhok |
| 6,304,359 B1 | 10/2001 | Gadhok |
| 6,317,637 B1 | 11/2001 | Limroth |
| 6,350,239 B1 | 2/2002 | Ohad et al. |
| 6,442,444 B2 | 8/2002 | Matsubara et al. |
| 6,449,564 B1 | 9/2002 | Kliman et al. |
| 6,453,722 B1 | 9/2002 | Xiong et al. |
| 6,463,352 B1 | 10/2002 | Tadokoro et al. |
| 6,510,353 B1 | 1/2003 | Gudaz et al. |
| 6,577,907 B1 | 6/2003 | Czyszczewski et al. |
| 6,646,397 B1 | 11/2003 | Discenzo |
| 6,690,534 B2 | 2/2004 | Ding et al. |
| 6,697,685 B1 | 2/2004 | Caldwell |
| 6,721,445 B1 | 4/2004 | Azencott |
| 6,774,601 B2 | 8/2004 | Schwartz et al. |
| 6,782,296 B2 | 8/2004 | Hoche |
| 6,822,415 B1 | 11/2004 | Komiya et al. |
| 6,826,519 B1 | 11/2004 | Fujino |
| 6,853,951 B2 | 2/2005 | Jarrell et al. |
| 6,876,167 B1 | 4/2005 | Jones |
| 6,885,972 B2 | 4/2005 | Samata et al. |
| 7,039,557 B2 | 5/2006 | Mayer et al. |
| 2001/0011550 A1 | 8/2001 | Zheng |
| 2003/0128240 A1 | 7/2003 | Martinez et al. |
| 2003/0163296 A1 | 8/2003 | Richards |
| 2004/0135534 A1 | 7/2004 | Cullen |
| 2005/0174124 A1 | 8/2005 | Huang |
| 2005/0251271 A1 | 11/2005 | Cutler |

FOREIGN PATENT DOCUMENTS

| | | |
|---|---|---|
| DE | 2629473 | 10/1982 |
| DE | 3505681 | 8/1985 |
| DE | 3520189 | 12/1988 |
| DE | 4211213 | 10/1993 |
| EP | 0260138 | 3/1988 |
| EP | 0378093 | 7/1990 |
| EP | 0339402 | 6/1993 |
| EP | 1283593 | 2/2003 |
| EP | 1298511 | 4/2003 |
| FR | 2600789 | 12/1987 |
| GB | 951785 | 3/1964 |
| JP | 63190584 | 8/1988 |
| JP | 01224189 | 9/1989 |
| JP | 04229088 | 8/1992 |
| JP | 05036851 | 2/1993 |
| JP | 07114402 | 5/1995 |
| JP | 2000028955 | 1/2000 |
| JP | 2000330641 | 11/2000 |
| JP | 2001142917 | 5/2001 |
| JP | 2001245488 | 9/2001 |
| JP | 2002199147 | 7/2002 |
| JP | 2003044111 | 2/2003 |
| WO | WO9318525 | 9/1993 |
| WO | WO9917282 | 4/1999 |
| WO | WO0133303 | 5/2001 |
| WO | WO0164591 | 9/2001 |
| WO | WO03097290 | 11/2003 |

OTHER PUBLICATIONS

Lasesys Corporation, Series LBS-6000 Galvanometric Scanners, Feb. 6, 2004, http:www.lasesys.com/galvanometric.html.

Phototonics Spectra, Cambridge Technology Inc. Digital Control Center DC900, Jul. 2003, http://www.photonics.com/spectra/minimag/XQ/ASP/minimagid.70/QX/read.htm.

Birou et al., "Real-time robot drive control with PM-synchronous motors using a DSP-based computer system," Power Electronics and Motion Control Conference, 2000. Proceedings. PIEMC 2000. The Third International Aug. 15-18, 2000, Piscataway, NJ, USA, IEEE, vol. 3, Aug. 15, 2000, pp. 1290-1295.

Y.H. Huang et al., "Autotuning of a servowriter head positioning system with minimum positioning error," J. Applied Physics, vol. 79, No. 8, Apr. 1996.

B.A. Brandin, "A digital approach to the disturbance-accommodation problem," Transactions of the Institute of Measurement and Control, vol. 10, No. 5, Oct. 1988, London, UK, pp. 273-280.

C.C. Hang et al., "On-Line Auto Tuning of PID Controllers Based on the Cross-Correlation Technique," IEEE Transactions on Industrial Electronics, vol. 38, No. 6, Dec. 1991, New York, US, pp. 428-437.

C.C. Hang et al., "Development of An Intelligent Self-Tuning PID Controller," Advances in Instrumentation and Control, vol. 47, No. 2, Jan. 1992, Research Triangle Park, US, pp. 1101-1111.

Levy, G.F.: "Numeric Activex Components" Software Practice & Experience, John Wiley & Sons Ltd, Chichester, GB, vol. 31, No. 2, Feb. 2001, p. 147-189.

Huang GQ et al.: "Web-based product and process data modeling in concurrent 'design for X'" Robotics and Computer Integrated Manufacturing, Pergamon Press, Oxford, GB, vol. 15, No. 1, Feb. 1999, p. 53-63.

Datasheets for Copley Controls Corp., 2002 (4 pages).

"Digital Servoamplifier Upgrades Brush Motor Drive Systems," Copley Controls Corp., New Product Release dated Apr. 28, 2002, pp. 1-7.

Y. Tzou, "Auto-tuning Control of Self-Commissioning Electric Drives," Power Electronics and Mechatronics Control Lab., Dept. of Electrical & Control Engineering, National Chiao Tung Univ., Taiwan, pp. 483-487.

Opposition Communication dated Jan. 3, 2006 and translation of pending claims in opposition proceeding regarding EP 896265.

* cited by examiner

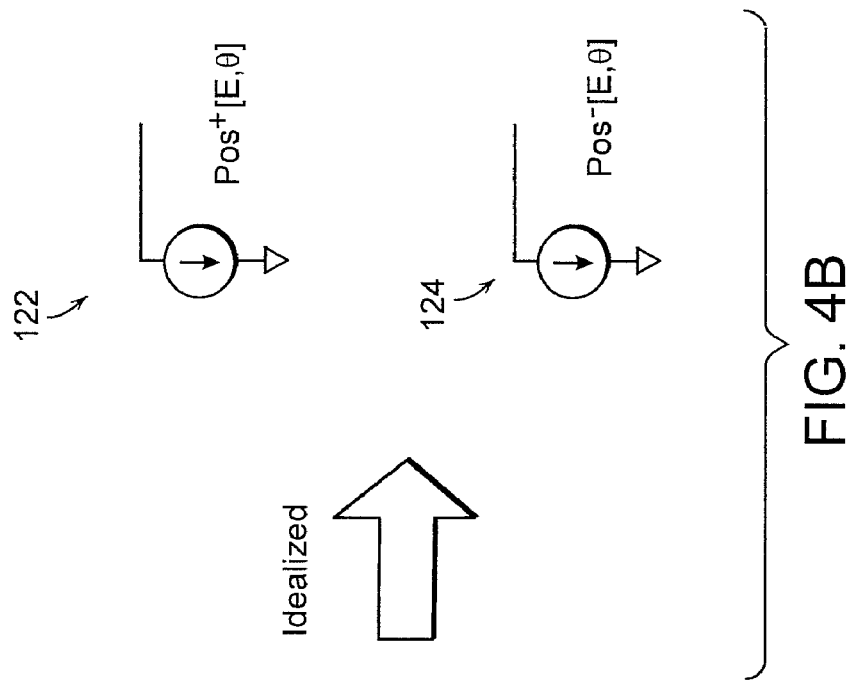
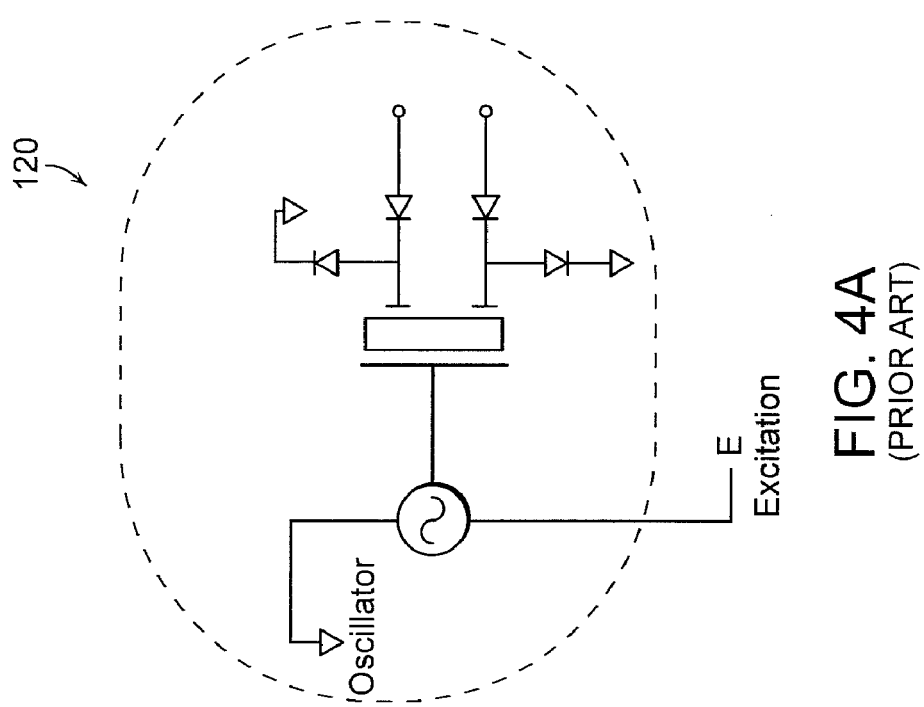
FIG. 4A
(PRIOR ART)
FIG. 4B

FIG. 9 Screen shot of Expert level tuning GUI

Screen shot of Applications level tuning GUI

Matrix of tunes window with arrows showing path between tunes.

| Symbol | Meaning |
|---|---|
| 1 | true/high |
| 0 | false/low |
| X | don't care |

610

DIGITAL CONTROL SERVO SYSTEM

PRIORITY

This application is a continuation application of U.S. patent application Ser. No. 09/957,788 which was filed on Sep. 21, 2001, which relates and claims priority for all purposes to pending U.S. provisional application Ser. No. 60/234,405, filed Sep. 21, 2000.

TECHNICAL FIELD OF THE INVENTION

The present invention relates to an improved servo system for an optical scanning device, and more specifically, to a servo system for optical scanning systems that incorporates digital servo control with an on-board processor and a graphical user interface (GUI) setup tool.

BACKGROUND OF THE INVENTION

A servo system is a control system that causes some output variable(s) to track some input variable(s). Traditional servo systems have employed analog servo circuits and processing techniques. These systems often use a "PID" (Proportional Integrator Derivative) control algorithm where an error signal contributes to subsequent control signals.

As digital sensors and processing techniques have become more common and cost-effective, many analog servo circuits have been replaced by digital implementations. Digital servo circuitry and digital processing provides significant advantages to the analog scheme. Namely, the digital version provides greater flexibility and stability as compared to the analog system. Digital circuitry also has many advantages such as smaller size and less heat dissipation.

Scanner and galvanometer servo systems have existed for many years in a variety of applications. These systems were slow to adapt to a digital topology because of the ruggedness and proven reliability of the existing designs. In addition, the typical scanner operation requires the very high dynamic range achieved with existing analog servo designs. Finally, the use of analog position feedback devices in these systems has contributed to the continuing use of analog servo systems.

There have been many attempts to effectively incorporate digital circuitry into servo systems and improve the digital processing techniques. However, many of these implementations still do not provide sufficient resolution during the entire servo process. Some examples are referenced below.

In Baker et al's U.S. Pat. No. 4,398,241, a computing means controls the servo and processes the feedback signals. The position and velocity signals are processed in the computer and issued to the servo through the described circuitry.

A servo feedback system is described in Barker et al's U.S. Pat. No. 4,282,468, where the feedback signals are generated in a resolver digitizer circuit. The resolver digitizer circuit generates pulses corresponding to the feedback. This digital error signal is fed to a digital to analog converter and the error signal is then applied to the servo. The advantages that accompany digital processing techniques produce a more accurate response.

A digital servo positioning system incorporating a lead/lag integrator is disclosed in Evans' U.S. Pat. No. 4,893,068. The integrator in the position control system is placed in parallel with the feedback loop and allows the integrator to switch between velocity error during pathtracking to position error during holding and moving states.

What is needed is a servo system that provides an increased dynamic range and greater effective resolution.

SUMMARY OF THE INVENTION

Accordingly, an object of the present invention is to provide a servo system that allows digital processing techniques to work with appropriate analog command and position feedback signals to provide a greater effective resolution and dynamic range of optical scanner operation.

A further object of the invention is the digitizing of an analog error signal in addition to separately digitized command and position feedback signals. In particular, the present invention employs a dual resolution scheme. A high-resolution path is available for low error conditions, while a low-resolution system can be used for higher error conditions. This provides greater effective resolution and dynamic range.

A further object of the invention is to permit the full dynamic range of the servo to be consistently applied to any part of the field of view. In order to accomplish this, the gain of the sensor and the gain and offset of the sensor processing circuitry are varied under digital control. In addition, compensation for diminished torque constant at the extremes of scanner position is provided.

An additional object is real-time, on-line tuning of the servo system operating algorithm and parameters described above. A graphical user interface (GUI) with simulated analog presentations and inputs is used to provide a simple operator interface tool to measure and alter system parameters through an on-board digital processor.

Another object is to store multiple "tunes" or sets of operating parameters within the on-board processor, and thereby permit switching between tunes in real-time in response to internal states and/or external commands. A tune consists of a servo algorithm as well as the variables that describe it. Changing a tune can consist of changing variables for use with the present algorithm or substituting a completely new algorithm with the same or new variables.

For example, the system could be commanded to have a high bandwidth tune for the flyback period of a raster waveform, and a quieter, low bandwidth tune for the forward scan period. As another example, for controlling laser marking applications, one tune can be used for marking, giving smooth, well-controlled motion, and another tune used for jumps between marks, giving the fastest speed and settling times. When marking large, filled shapes or characters, one tune can be used for marking the outline with smooth, well-controlled motion and another tune used to fill the interior at higher speed. As another example, the system can change its tune in response to detection of over-position or clipping of the output amplifier.

Yet another object of the invention is to provide a real-time scanner capacity to monitor rotor magnet thermal margins by calculating peak coil temperatures from scanner current and thermal parameters, and combining this information with baseline temperature readings from a sensor located in the scanner. The on-board sensor and thermal model of current allows continual operation of the device close to the thermal limits of the scanner by accounting for both ambient temperature and coil current heating.

Still other objects and advantages of the present invention will become readily apparent to those skilled in the art from the following detailed description, wherein only a preferred embodiment of the invention is described, simply by way of illustration of a best mode contemplated for carrying out the invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the attached drawings, and in which:

FIG. 4A is a schematic of a prior art position detector circuit.

FIG. 4B is an idealized representation of the position detector circuit of FIG. 4A.

DESCRIPTION OF THE PREFERRED EMBODIMENT

Figure 1A:
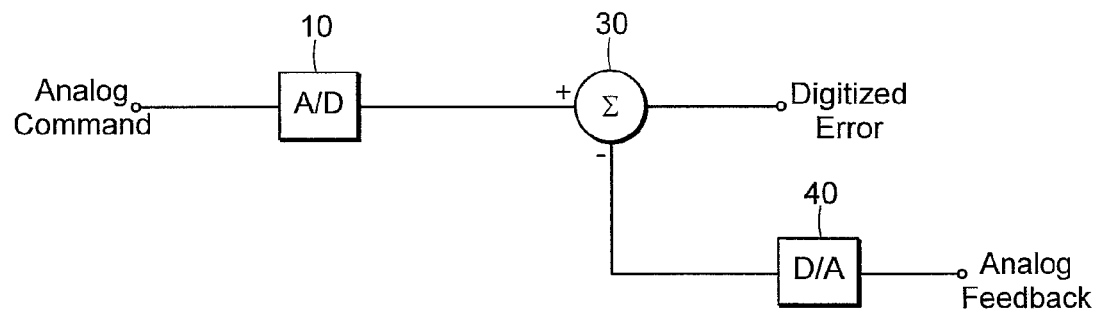
FIG. 1A is a prior art block diagram analog servo circuit element with digital error signal, using an analog input an A/D converter, and a D/A converter in the feedback circuit.
Figure 1B:
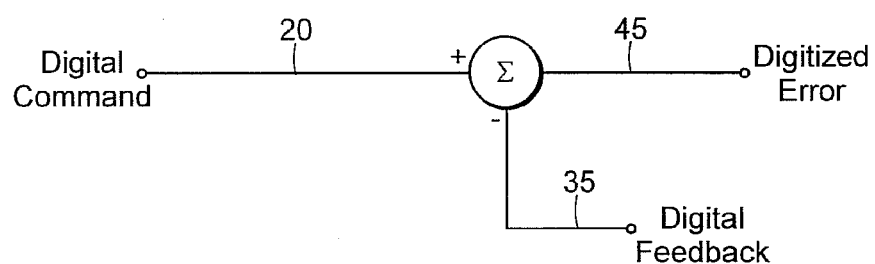
FIG. 1B is a prior art block diagram of an all digital servo circuit element.

The invention is susceptible of many embodiments, including the following preferred embodiments. The description includes reference to prior art practices for context. FIGS. 1A and 1B depict prior art servo feedback system elements. There are basically two forms of existing servo feedback architectures, an analog system in the form of a resolver and a digital feedback system in the form of an encoder. FIG. 1A is an analog position feedback servo system element, where the analog command and position feedback signals are separately digitized by A/D converters 10 and 30. The error is then the arithmetic sum of these two digitized values as represented by summation symbol 30, the function being performed by the system processor. FIG. 1B illustrates the digital feedback servo system element where a digital command 20 and a digital position feedback signal 35 are summed to produce a resultant digitized error signal 45.

Figure 2:
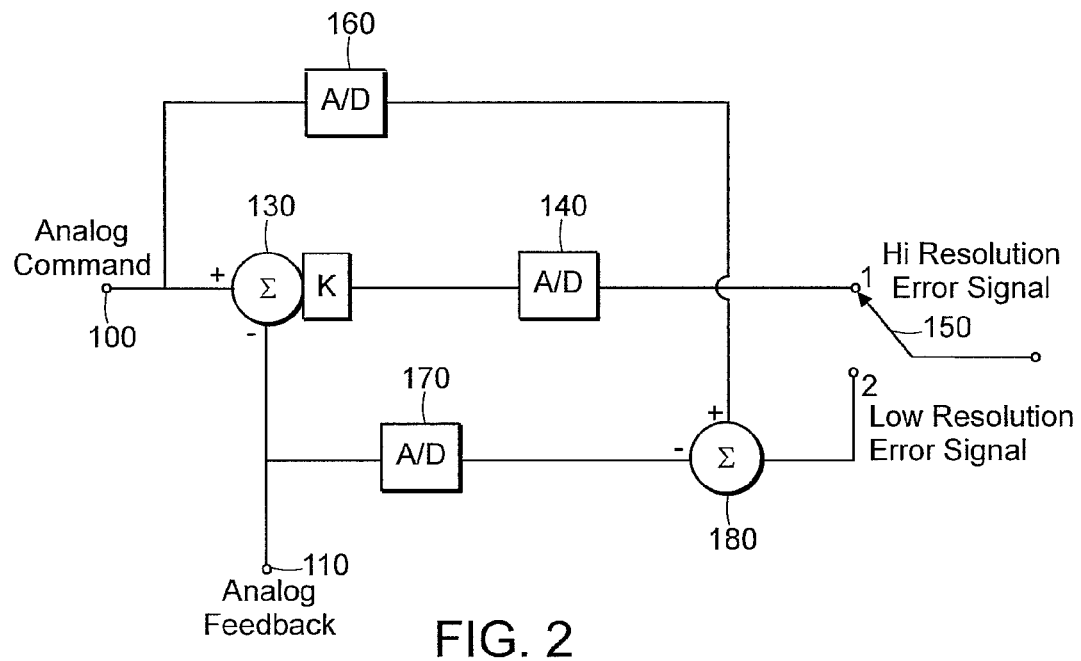
FIG. 2 is a simplified schematic of a preferred embodiment of the invention showing High/Low resolution digital error switching in a servo circuit.

Referring now to FIG. 2, a preferred embodiment of the invention is illustrated as a functional schematic. The servo system uses a switch selectable low-resolution/high-resolution circuit where the arithmetic sum of the separately digitized analog command and position feedback signals is available as a digital error signal, as is the digitized sum of the analog signals. The analog summing circuit element 130 includes a fixed or variable gain K to provide a higher resolution error signal which is digitized at A/D converter 140 to produce a digital high resolution error signal 1. A low resolution error signal 2 is generated by converting analog command signal 100 at A/D converter 160, analog position feedback signal 110 at A/D converter 170, and summing the result as represented by summation unit 180. Switch 150 is automated to alter the selection of error signal output from high resolution signal 1 to low resolution error signal 2 when large errors cause A/D converter 140 to saturate. This condition is defined as when the output signal value of converter 140 reaches either its positive or negative limit. The error signal selection reverts back to high resolution signal 1 when the condition abates, under control of the servo system processor and software. The digital functions of the circuit, such as the summation provided by unit 180 and switch 150, are executed in an embedded system processor and computer code.

Figure 3:
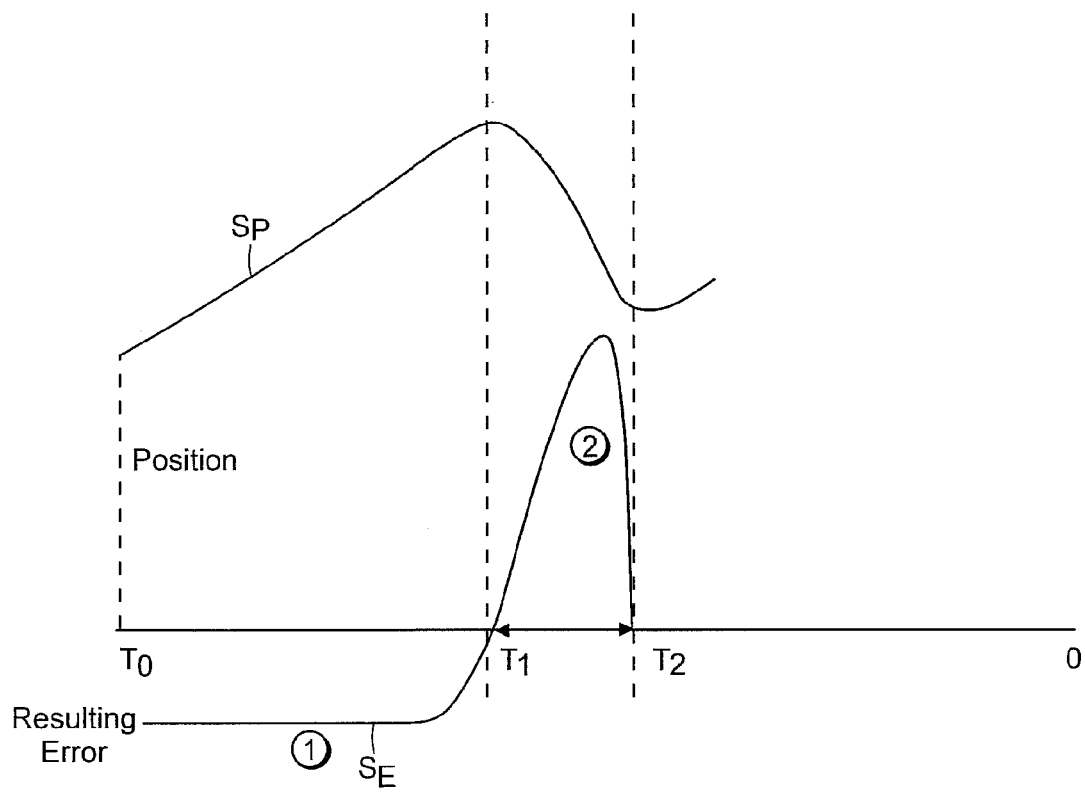
FIG. 3 is a graph of raster scan of position vs. error signal.

To illustrate the use of this hi/low resolution error signal capability, a typical raster scan waveform is shown in FIG. 3, with position signal $S_P$ and error signal $S_E$ shown for a cycle of scanner motion. The error signal is small while the servo is operating in a low velocity condition, also called the forward scan state, from $T_0$ to $T_1$. During the reverse, or flyback state, from $T_1$ to $T_2$, the error signal increases with the higher velocity. The switching between high and low resolution error signals referenced in FIG. 2 is triggered when the error signal from the gain circuit 130 exceeds the limitations of the A/D converter 140. Switch 150 then switches to the lower resolution error signal 2. As explained above, this occurs only when A/D 140 is saturated, which is a function of variables such as frequency and amplitude of waveform and how the circuit is tuned.

In prior art FIG. 4A, a simplified schematic of a position detector in a scanner is shown. This type of position detector is ubiquitous in the industry and is described, for example, in Rohr's U.S. Pat. No. 4,864,295 and in Dowd's U.S. Pat. No. 5,537,109. An excitation voltage E is connected to an oscillator. The scanner moving element has plates that modulate currents that are used to detect the position of the scanner. The scanner position detector can be idealized as two current sources as shown at 122 and 124 in FIG. 4B. The Pos+ and Pos− currents are a function of the excitation voltage E and scanner angular position θ. The excitation voltage level directly influences the size of the Pos+ and Pos− signals such that, for a given angular position, increasing the excitation voltage also increase the Pos+ and Pos− currents and the difference between them.

The cited patents also describe the Sum/Difference Detector architecture. The circuitry in the servo system serves not only to calculate the difference between Pos+ and Pos− but the sum as well. It compares that sum to some reference voltage Ref, and adjusts the excitation voltage E to keep the sum and Ref equal.

One of the unique features of the present invention is the manipulation of this reference level Ref. A preferred embodiment places Ref under digital control via a D/A converter, allowing digital control of the excitation voltage which thereby provides digital control of the gain of the sensor. In a preferred embodiment, this gain can be varied by a factor of 10 or more, enabling a fuller dynamic range than the prior art systems.

Figure 5A:
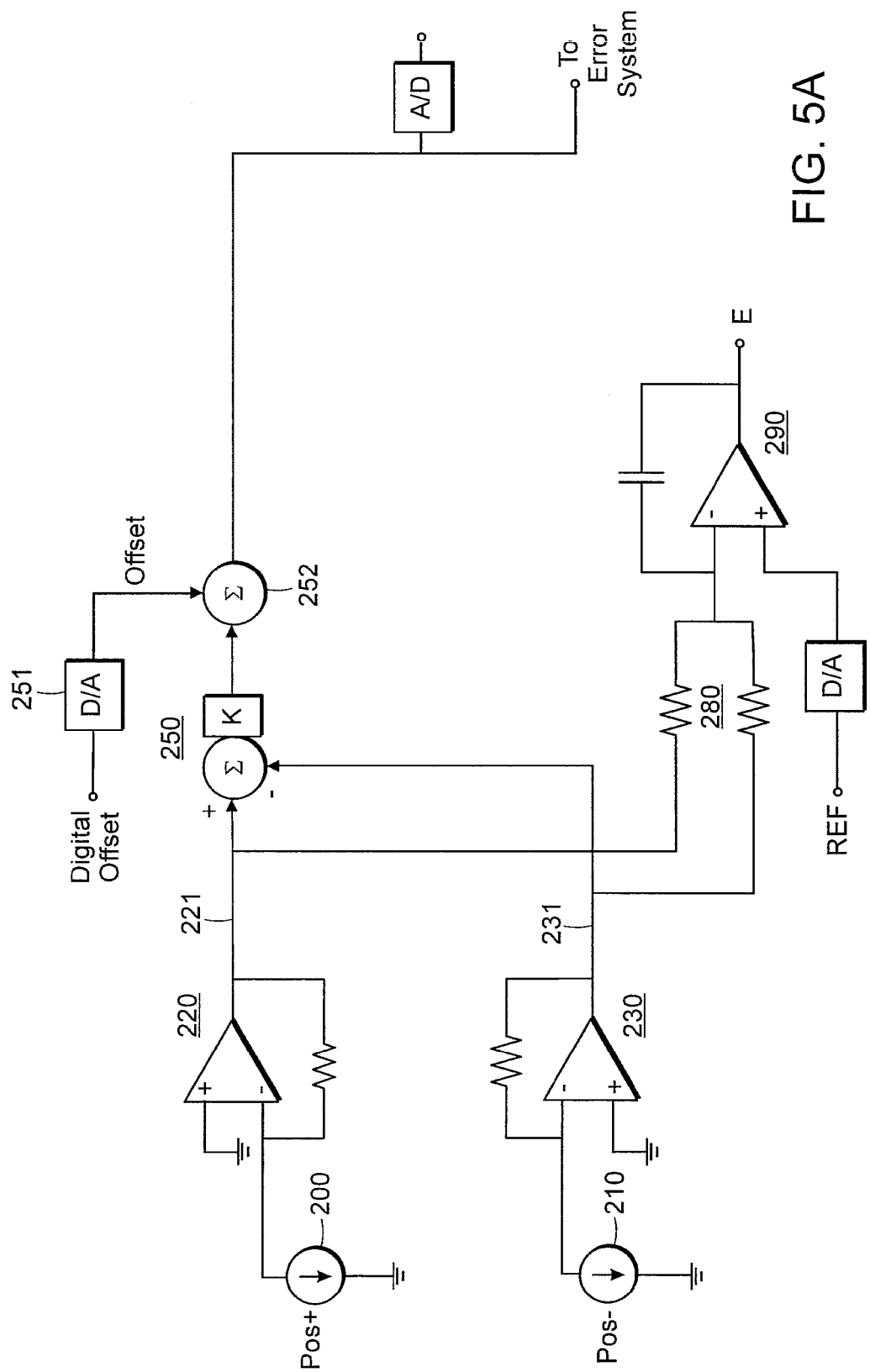
FIG. 5A is a functional schematic of a preferred embodiment servo circuit with adjustable reference voltage for adjusting sensor gain, differential amplifier and gain section, and adjustable offset voltage for adjusting circuit gain.

Referring now to the preferred embodiment servo circuit of FIG. 5A, each current source 200, 210, is connected to a respective transconductance amplifier 220, 230, which outputs a respective voltage signal 221, 231. Scanner position is represented by the difference between these two voltages, as determined by the differential amplifier 250, whose gain K is adjustable. An offset signal voltage under digital control of the system processor and computer code, and applied via a D/A converter 251, adjusts the zero point of the system via summing node 252.

Figure 5B:
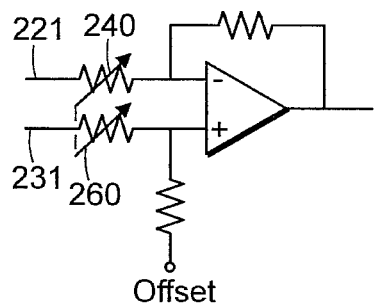
FIG. 5B is a first example embodiment of the differential amplifier section of the circuit of FIG. 5A.
Figure 5C:
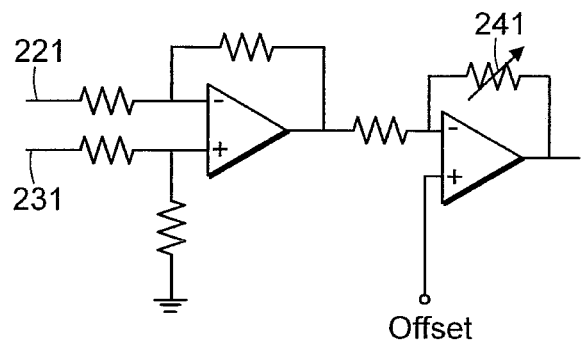
FIG. 5C is a second example embodiment of the differential amplifier section of the circuit of FIG. 5A.
Figure 5D:
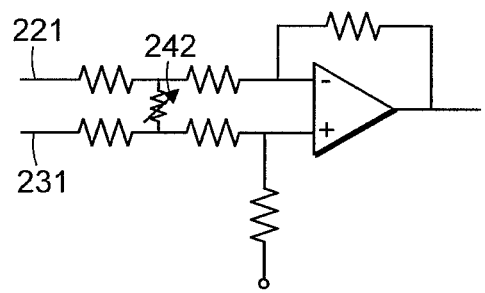
FIG. 5D is a third example embodiment of the differential amplifier section of the circuit of FIG. 5A.

Differential amplifier 250 and offset summing node 252 may be implemented in a variety of ways. For example, FIG. 5B shows a preferred embodiment example in which variable resistors 240 and 260 are ganged or varied simultaneously to the same value for adjusting gain K. FIG. 5C shows another preferred embodiment example in which resistor 241 is variable for adjusting gain K. FIG. 5D shows another preferred embodiment example in which resistor 242 is variable for adjusting gain K. In each of FIGS. 5B, 5C, and 5D, the variable resistor(s) may be digitally controlled variable resistors or a set of fixed resistors with digitally controlled switches. Other schemes are commonplace in other servo applications. For example, embodiments may be implemented using an Analog Devices™ AD8400 (no claim is made to the trademark or product designator) digitally controlled variable resistor.

Referring back to FIG. 5A, the positive and negative position voltage signals are also summed via a resistor network 280 and the resulting signal is compared to a digitally controlled reference signal Ref, by operational amplifier 290. The operational amplifier adjusts the position detector excitation voltage E, to keep the sum equal to the reference voltage.

In summary, there is digital control via the system processor and computer code of the reference signal Ref, that controls the excitation voltage E, which in turn controls the gain of the sensor. There is also a control of the gain of the electronics associated with the sensor.

Figure 6:
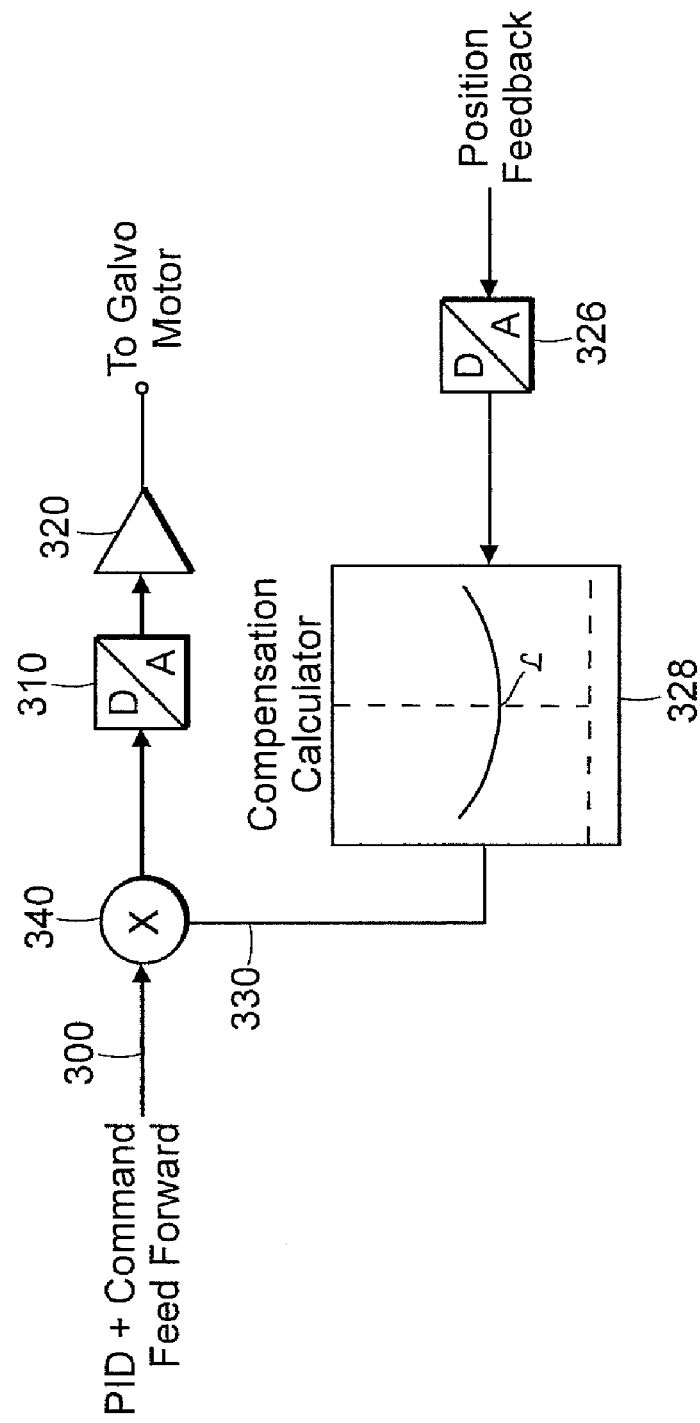
FIG. 6 is a wide angle compensation embodiment of a servo circuit with selectable algorithms in the digital section.

Referring now to FIG. 6, another aspect of the invention is compensating for changes in torque constant due to scanner angular position. When designing a servo system for a typical commutated rotating DC motor, it is reasonable to assume that the relationship between coil current and generated torque is constant regardless of rotor position. However, this is not the case for limited-angle non-commutating galvos, where torque per unit current falls slightly at large angles. Wide angle compensation boosts output control effort, which is a voltage, at large angles to correct for this loss of torque, as illustrated in FIG. 6. The result of PID and command feedforward servo control 300 would usually be sent directly to D/A converter 310 which drives an amplifier 320 attached to the galvo motor. In the present invention, a boost factor 330 is digitally calculated at compensation calculator 328 from the digital output of A/D 326 from the analog position feedback signal, and fed to multiplier 340. By compensating for torque constant variation with angle, system response is more nearly uniform at all angles of operation.

Figures 7A, 7B:
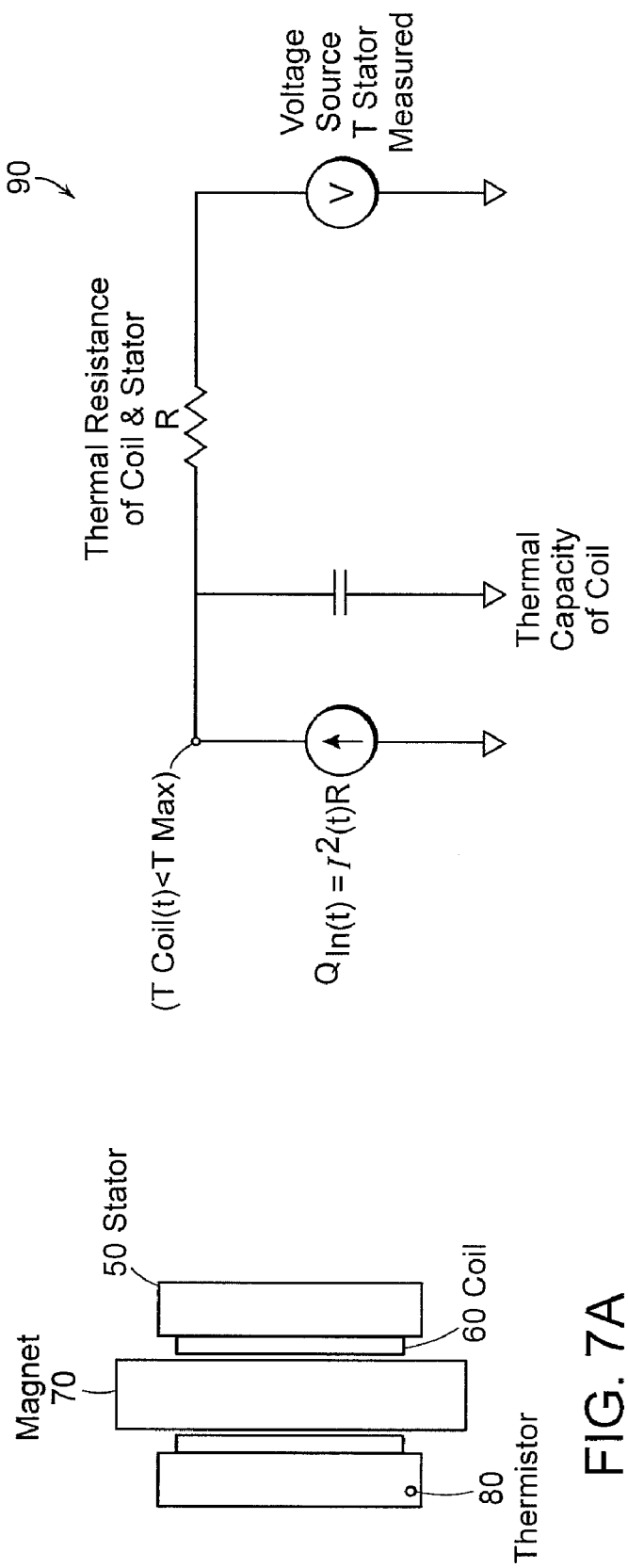
FIG. 7A is a physical sideview depiction of scanner components with a thermistor.
FIG. 7B is an electrical equivalent schematic diagram of a scanner components thermal model of the embodiment of FIG. 7A.

A further variation of the preferred embodiments is illustrated in FIGS. 7A and 7B, which illustrate graphical side views of a scanner and an electrical analogue of the thermal model. Scanners have a critical temperature threshold. At a maximum temperature of around 100-200° C., depending on material, magnets will demagnetize, rendering the system useless. Therefore, it is desirable to have a system, which can monitor scanner temperature and shut down the servo if necessary to protect the scanner. Ideally, the instantaneous temperature of the surface of the magnet would be the most helpful measurement. For practical purposes the coil temperature provides the most accurate reflection of the magnet temperature in moving magnet scanners.

As shown in FIG. 7A, moving magnet scanners constitute a magnet 70, a pair of coils 60, and a stator 50. According to the present invention, a thermocouple or thermistor 80 is tightly coupled to the stator to track stator temperature.

Employing an RMS current limit is known in the art, which roughly translates coil current (I) into peak temperature. The prior art systems use the formula ($I^2 \cdot R_{coil}$) to calculate the instantaneous heat input to the system. This is combined with an integrator whose time constant corresponds to the thermal time constants of the scanner, and gives a rough indicator of the thermal rise of the coil system above the baseline temperature.

However, the prior art systems do not know the baseline temperature of the system. Thus, the prior art methodologies either assume a higher temperature than actually exists and rob the system of available thermal margin or assume a lower ambient temperature than actually exists and run the risk of overheating and destroying the system.

According to the preferred embodiment of the present invention, the temperature of the stator is measured by a thermistor and used as the baseline temperature. The RMS model then calculates coil temperature excursions above this baseline, yielding a much more reliable picture of actual coil temperature. In the electrical analogue of the thermal model, shown at 90 in FIG. 7B, heat corresponds to current, temperature to voltage, and coil and stator thermal resistance to the resistor.

In a moving coil scanner, the present invention would again be used, this time to protect the coil itself from overtemperature damage.

Figure 8:
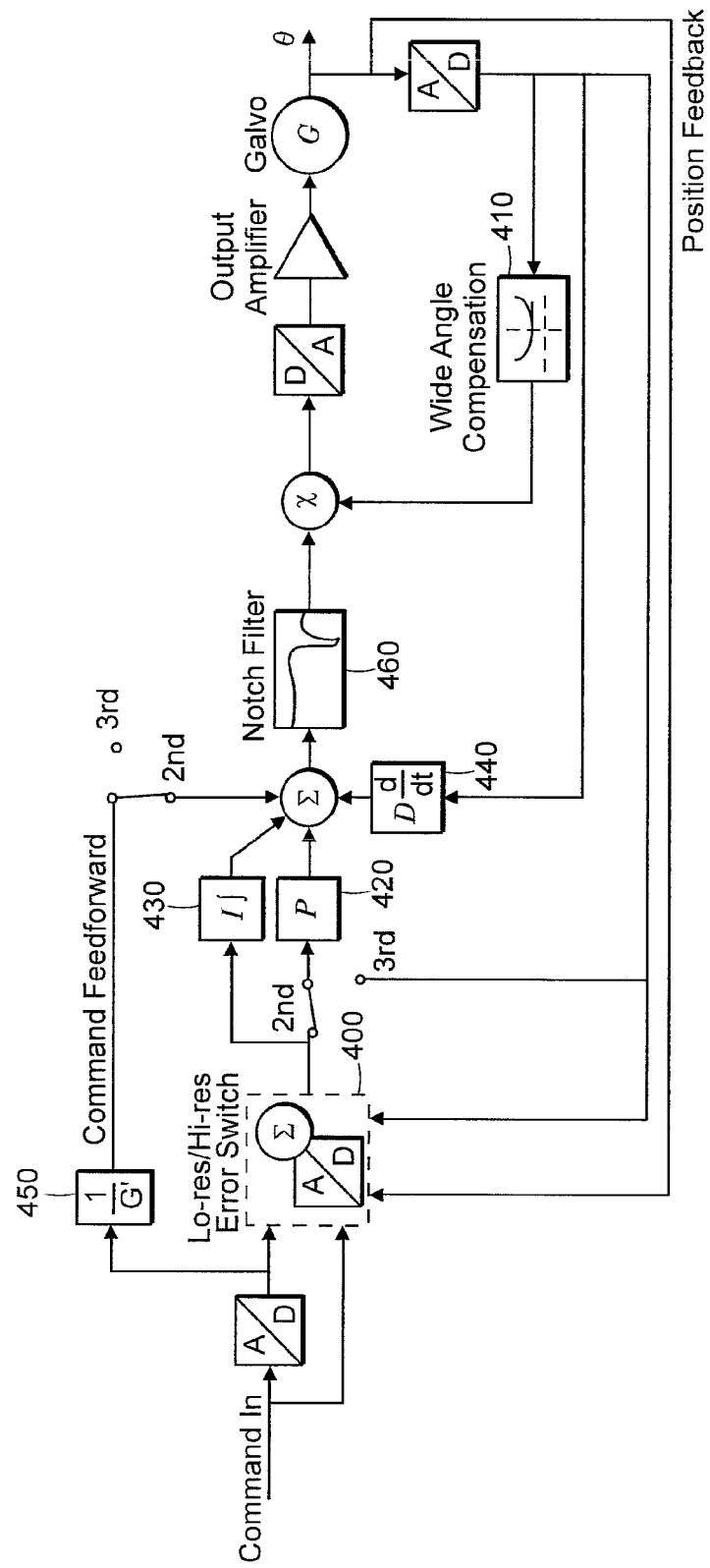
FIG. 8 is a schematic diagram of elements of the invention in a preferred embodiment of the digital control servo system for an optical scanner device.

FIG. 8 is a schematic representation of many of the elements of the invention in a present implementation of a digital control servo system for a galvanometer optical scanner device. In particular, the lo-res/hi-resolution error switch 400 as described above and the wide angle compensation 410 as described above. As illustrated in FIG. 8, a present implementation supports a second order (also known as "error proportional", "speed", or "type 0") PID (Proportional 420-Integrator 430-Derivative 440) with Command Feedforward 450 algorithm and a third order (also known as "position proportional", "accuracy", or "type 1") PID algorithm as well as a notch filter 460. Other algorithms are possible. For example, the derivative block 440 shown in FIG. 8 takes digitized position feedback as the input for both second order and third order tunes; an alternative would be to use error as the input for second order tunes.

Figure 9:
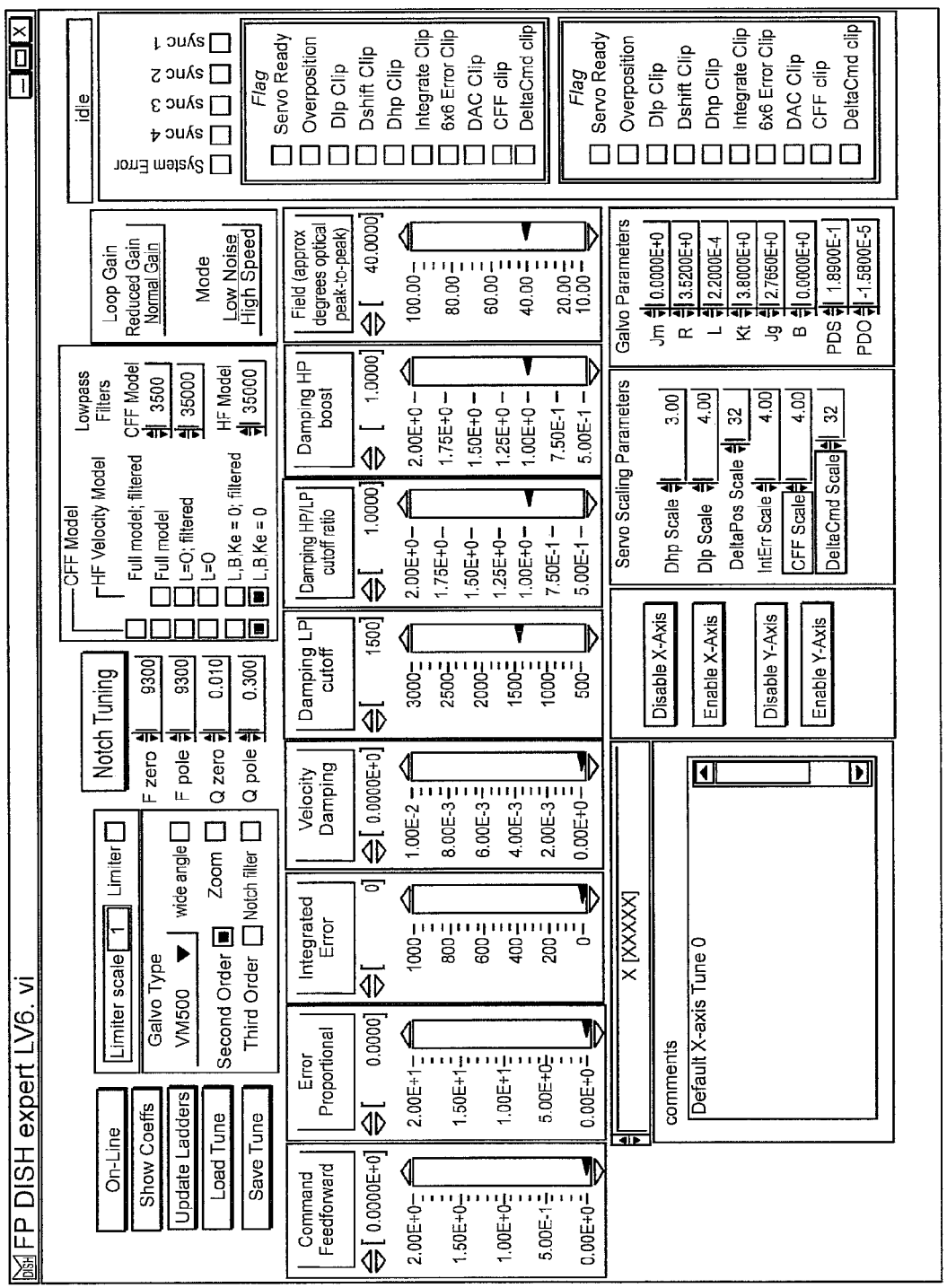
FIG. 9 is a screen shot of expert level tuning with a graphic user interface.

Referring now to FIGS. 9-13, the graphical user interface (GUI), of which several screens are illustrated, is designed to give users skilled in the art an experience which is not unlike that of an analog servo system. The GUI, which runs on a personal computer or other general purpose computer and keyboard which interfaces with an embedded control processor in the servo device, is a set up device for programming the operation of the scanner. Continuously variable mouse-controlled sliders act much like the potentiometers of an analog system and perform many of the same functions. Boxes may be checked to enable various optional features such as a notch filer and wide angel compensation. The GUI can assume multiple configurations depending on the intended user and the required tune algorithm. For example, FIG. 9 shows at 500 an "expert" configuration screen with a large set of controls and controls for a second order tune algorithm. Once the servo device is programmed, the GUI is no longer necessary.

Figure 10:
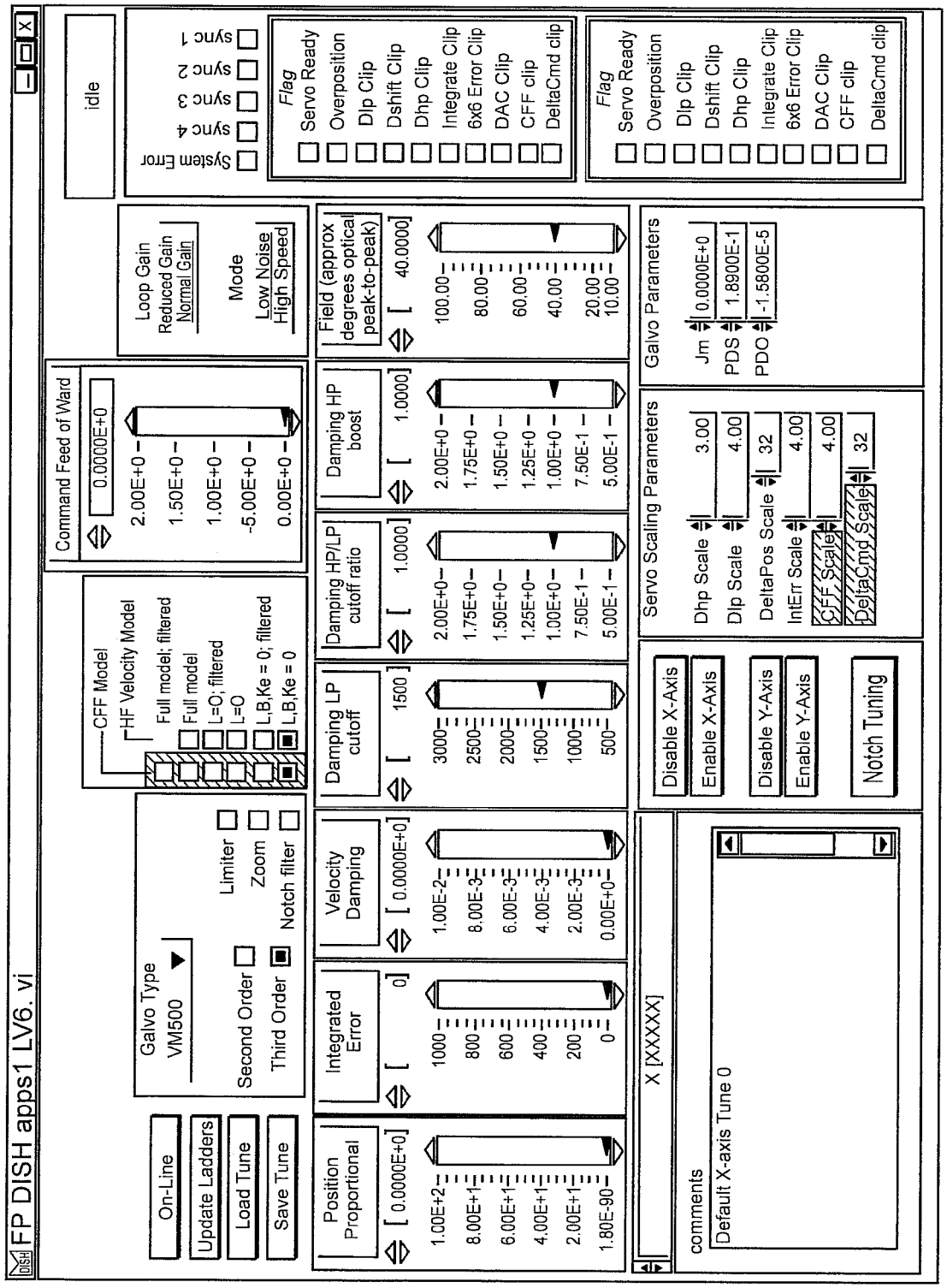
FIG. 10 is a screen shot of applications level tuning with the graphic user interface of FIG. 9.

FIG. 10 shows at 510 a more restricted configuration screen where certain options have been eliminated for simplicity. The configuration shown here is for a third order tune algorithm. Note that the Error Proportional slider of FIG. 9 has been replaced by the Position Proportional slider and that the command feedforward adjustments have been dimmed because they are not available for the third order tune algorithm. Selection of the algorithm is made by the user via the Second Order and Third Order buttons in the upper left region of each screen shot. Adjustment to a tuning parameter is transmitted automatically to the servo hardware for real-time, "on-line" tuning.

Figure 11:
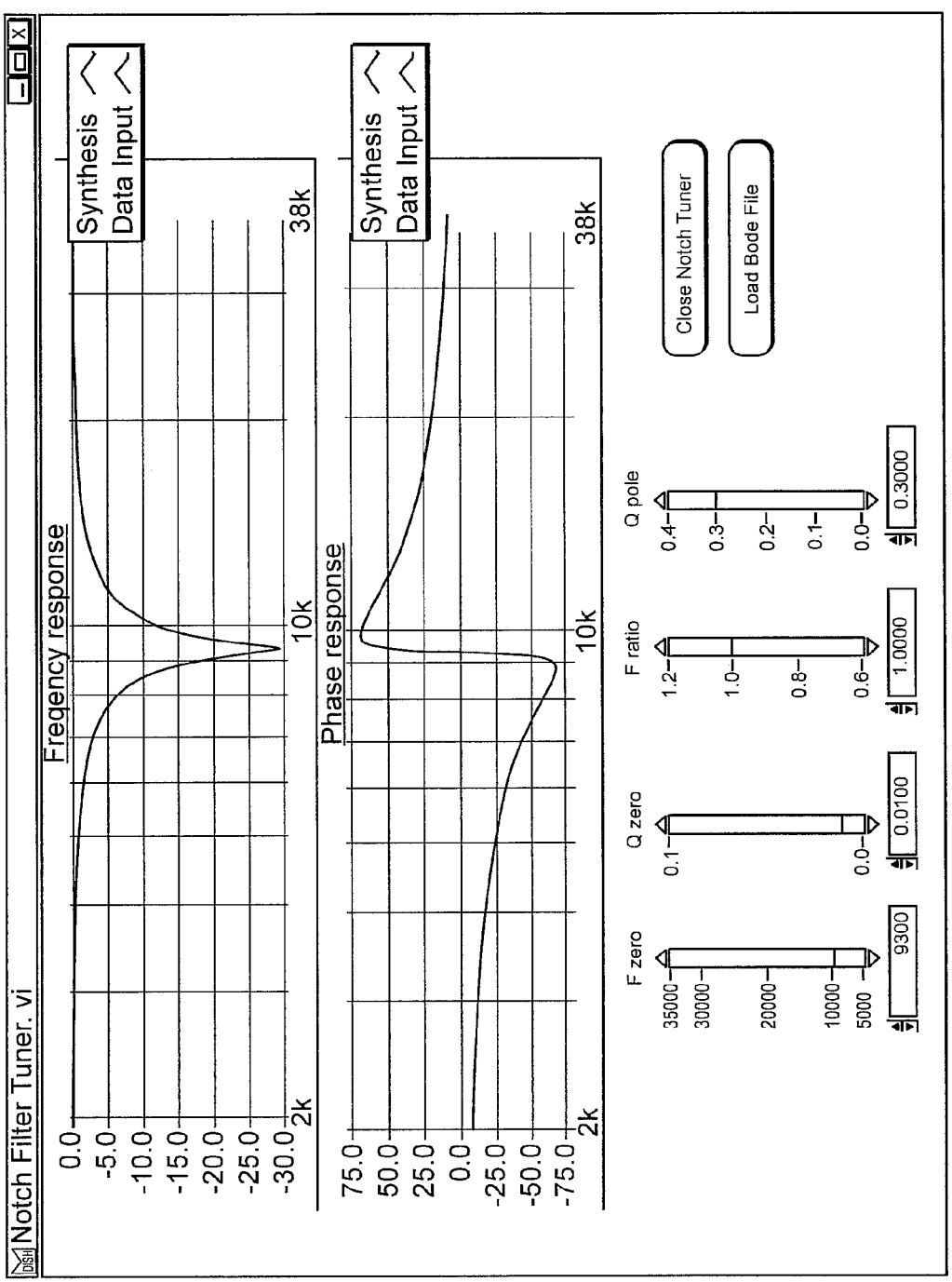
FIG. 11 is a screen shot of the notch filter tuning window of the graphic user interface of FIG. 9.

Similarly, another feature of the servo is an integrated notice filter, shown in FIG. 11. The filter includes a user interface shown at 520 that allows design of the appropriate filter visually in the frequency domain. Adjustments are transmitted automatically to the hardware.

The response behavior of any servo system is determined, in part, by its tuning. For a PID-type tuning, a tune is the state of a number of variables, including P, I, D, gain, offset and filter coefficients, to name a few. There are times when it is desirable to be able to change from one tune to another while the system is in use. For example, in laser marking, a pair of galvanometers direct a high energy laser beam to mark an article. There are at least two operations with different requirements: low-noise, well-controlled velocity while marking, and high-speed, fast-settling jumping to the next letter. In addition, for filled letters, an intermediate speed tune may be desirable for the fill operation.

Figure 12:
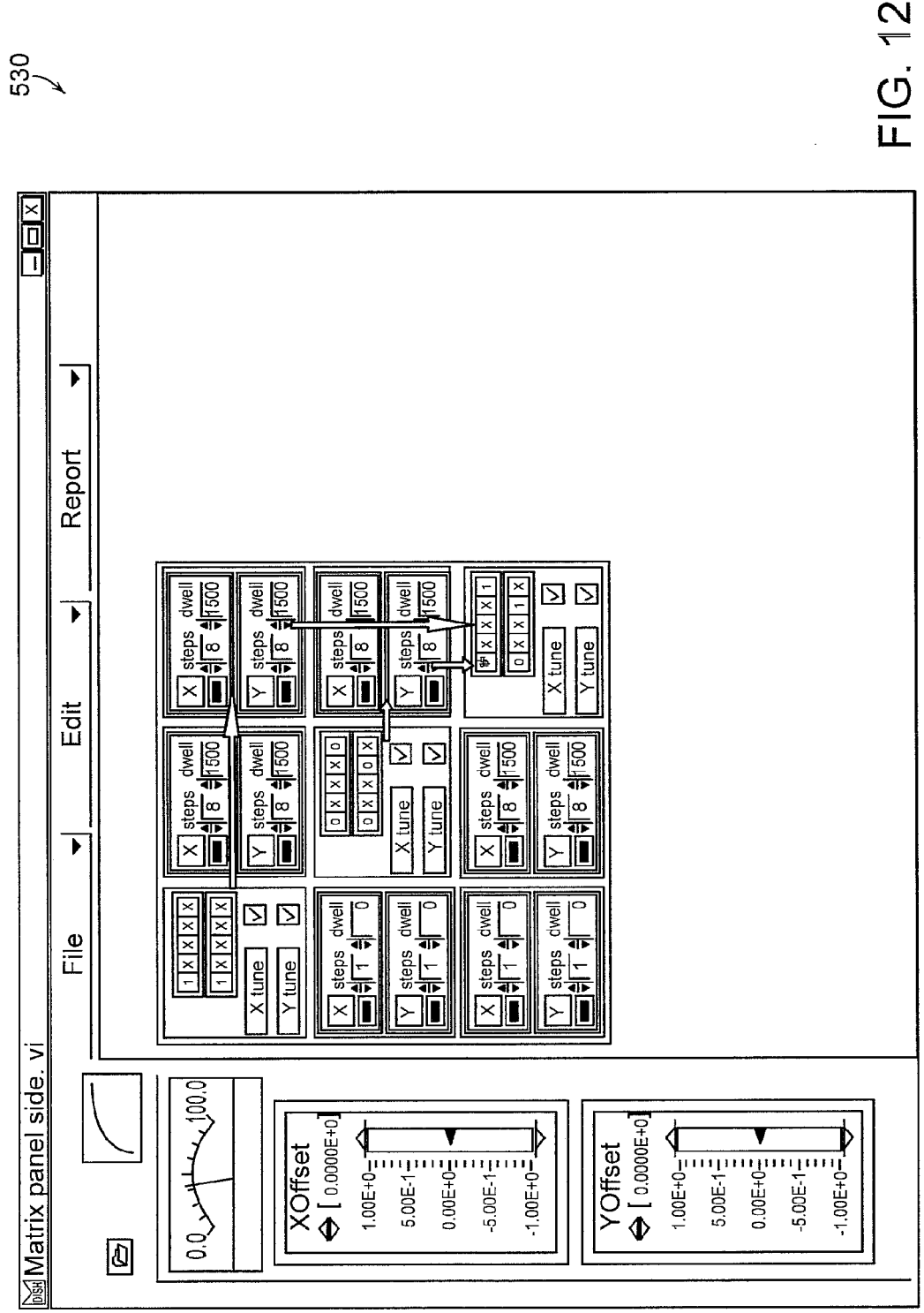
FIG. 12 is screen shot of the tunes matrix of the graphic user interface of FIG. 9, with arrows showing the path between tunes.
Figures 13A, 13B:
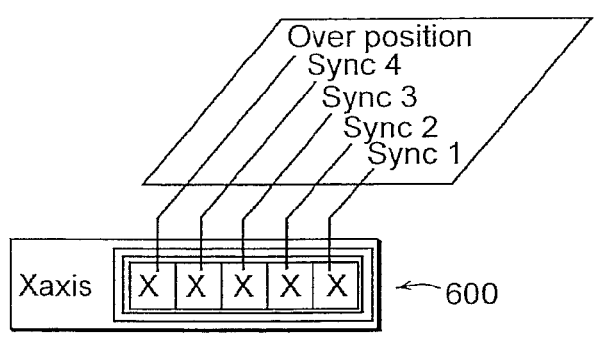
FIGS. 13A and B are a diagram and table showing the 5 bit word construction and symbol meaning for tune selection using the graphic user interface of FIG. 9.

Another feature of the servo is illustrated by the matrix in FIG. 12 shown at 530 and through the use of the addressing scheme as shown at 600 and 610 in FIGS. 13A and 13B, showing a means of associating specific tunes with a set of internal and external system states. For each axis, a tune matrix is a set of tunes and their 5-bit selection rules for testing the 5-but "address" formed by the axis OverPosition Status Flag and four logic level sync input pins. Selection rules must be mutually exclusive: two tunes for the X axis with selection rules 0XXXX and XXXXX would not be allowed because, for instance, 01111 (not OverPosition, all sync inputs high) would fit both rules. Incomplete rule sets are permissible, e.g. selection rules XXXX00, XXX01, and XXX10 for three Y-axis tunes would not include 01111 and the servo would not change tunes in response to this address. This matrix of tunes may be stored in the servo's non-volatile flash memory.

When two tunes have markedly different characteristics, an abrupt switch from one to another may cause system instability. Transitioning through a number of intermediate tune states may be required. The off-diagonal elements in the tune matrix indicate how "tune ladders" are to be built between tunes to ensure smooth operation. "Steps" is the number of intermediate tunes used to move from one tune to another. "Dwell" is the number of servo cycles to spend on each step. These numbers may be entered directly. As the arrows in FIG. 12 indicate, the matrix is traversed clockwise when moving from one tune to another. Thus, moving from "low noise" to "high speed" involves the Tune Ladder Block at the intersection of row 2 and column 3 in FIG. 12; the X axis of will employ 5 steps, the Y axis will employ 9 steps, and X & Y will each employ 8 steps when recovering from an overposition state to the "high speed" tune.

The invention is susceptible of other and various embodiments, all within the scope of the claims that follow. For example, the servo described here can be used alternatively to refocus the lens of the optical scanning device or system.

As another example, again similar to FIG. 2, there is a digital servo system for an optical scanner incorporating a digital processor and computer code and a signal processing circuit with inputs for an analog position command signal and an analog position feedback signal, and an error signal output. The circuit includes a first circuit element for producing an analog position error signal from the position command signal and the position feedback signal. A second circuit element produces from the analog position error signal a first digitized error signal known as a high resolution error signal. A third circuit element produces a digitized analog position command signal. A fourth circuit element produces a digitized analog position feedback signal. The digital processor and computer code generates a second digitized error signal known as a low resolution error signal as a difference signal between the digitized command signal and the digitized feedback signal. The digital processor and computer code provide automatic switching of the error signal output from the high resolution error signal to the low resolution signal during periods when the second circuit element is at its maximum positive or negative output limit.

There may be generated by the processor and computer code a digitally operative scanner angle torque compensation control effort multiplier voltage, derived from the digitized position feedback signal input.

The processor and computer code may be connected to a graphical user interface. The graphical user interface may provide simulated analog presentations of servo algorithms and operating parameters, and permit simulated analog control inputs in real-time via hand or finer motion input devices like a mouse or a joy stick or other devices accepting physical, analog actuation, for manipulating a multiplicity of servo system operating parameters.

As an additional example, related to the embodiment of FIG. 5, there may be a digital servo system for an optical scanner, where the servo system includes an analog position command signal input, a digital error signal output, an analog position feedback signal processing circuit with positive and negative angular position sensors connected to an analog differential amplifier, and an analog position error signal with gain. The analog position error signal is derived from the analog command and the differential amplifier by the feedback signal processing circuit.

There is a digital processor and computer code, and a reference voltage controlled by the processor and computer code and connected to the feedback signal processing circuit for controlling the circuit gain. There is a high resolution error signal consisting of a digitized form of the analog position error signal, and a low resolution error signal consisting of a digital differential of a digitized form of the command signal input and a digitized form of the analog position error signal.

As in some other embodiments, the digital processor and computer code provides automatic switching of the error signal output from the high resolution error signal to the low resolution signal during periods when the second circuit element is at its maximum positive or negative output limit.

There may be a digital control output from the processor and computer code connected to the feedback signal processing circuit for adjusting the gain of the differential amplifier. The gain of the differential amplifier may be adjustable through two equal resistor sets in the feedback signal processing circuit, one each of the resistor sets being connected between a respective position sensor and the differential amplifier, with the resistor sets ganged mechanically or digitally for concurrent selection of equal subsets of resistance value by operation of the processor and computer code.

There may be an offset voltage controlled by the processor and computer code and connected to the feedback signal processing circuit for adjusting the zero point of the servo system. There may be a digitally constructed scanner angle torque compensation control effort multiplier voltage derived from the feedback position signal by the processor and computer code.

Again, there may be in this example a graphical user interface connected to the processor and computer code. The graphical user interface may provide a simulated analog presentation or multiple forms of presentations, of servo algorithms and operating parameters, and permit simulated analog control inputs in real-time via hand or finger motion input devices for a multiplicity of servo system operating parameters. The graphical user interface maybe a personal computer or general purpose computer, keyboard and a hand or finger analog motion cursor control device like a mouse or joy stick.

Further, the processor, computer code and graphical user interface may provide for simulated analog control inputs for programming of sequentially executable user constructed tunes or algorithms, where the tunes are recordable in the processor and computer code for automated sequencing during subsequent scanner operations.

As still another example, there is a process for calculating rotor magnet operating temperature in a galvanometer, including the of the steps of sensing the stator temperature of a galvanometer with a thermal sensor proximate the stator, sensing coil current in said galvanometer, calculating temperature rise in the system from the effects of coil current, and adding the calculated temperature rise to ambient stator temperature.

For implementing the process, there may be in an optical scanner a thermal sensor proximate the stator, a coil current sensor, a thermal model in the processor associating temperature rise in the system with coil current level, and a program in the processor for calculating temperature rise assumed from affect of coil current and adding to it the actual temperature from said thermal sensor so as to indicate the system operating temperature.

The present invention has been particularly shown and described with respect to certain preferred embodiments of features in the written description, figures, and claims. However, it should be readily apparent to those of ordinary skill in the art that various changes and modifications in form and details may be made without departing from the spirit and scope of the invention. Additional objects and advantages of the present invention may be further realized and attained by means of the instrumentalities and combinations all within the scope of the claims. The drawings and description are to be regarded as illustrative in nature, and not as restrictive.

What is claimed is:

1. A limited rotation motor optical scanning system comprising:
   a limited rotation motor scanner element adapted for directing an energy beam to at least one location within a field of view;
   a digital controlled servo system adapted for controlling motion of the limited rotation motor scanner element in accordance with a servo command waveform;
   a position feedback unit for providing a position feedback signal indicative of a rotational position of said limited rotation motor scanner element;
   a wide angle compensation unit for receiving said position feedback signal and for providing a boost signal that is representative of a boost factor that compensates for torque constant variation with the rotational position of said limited rotation motor scanner element;
   a digital processor for providing a set of control parameters for use during the command waveform in conformance with which said command waveform will be employed to control motion of the limited rotation motor scanner element; and
   an adjustment unit for providing an adjusted output signal responsive to said control parameters and responsive to said boost signal to control the motion of the limited rotation motor scanner element while compensating for torque constant variation with the rotational position of said limited rotation motor scanner element during the command waveform.

2. The system of claim 1, wherein the control parameters includes at least two of a proportional coefficient, an integral coefficient, a derivative coefficient, a system gain, an offset coefficient, and a bandwidth filter.

3. The system of claim 1, wherein the control parameters are closed-loop control parameters.

4. The system of claim 1, further comprising a graphical user interface, which is operatively coupled with the digital processor, and is adapted to allow a user to provide input for the control parameters.

5. The system of claim 4, wherein the graphical user interface is adapted to permit simulated analog control inputs in real-time for one or more servo system closed-loop control parameters.

6. The system of claim 4, wherein the graphical user interface is adapted to permit real-time tuning of the digital controlled servo system.

7. The system of claim 4, wherein the graphical user interface runs on a computer that is adapted to interface with the digital processor, and provides a set-up tool for programming servo system operation.

8. The system of claim 4, wherein the graphical user interface includes a filter tuner that allows a user to visually design a filter in the frequency domain.

9. The system of claim 8, wherein the servo system features include at least one of a notch filter, notch filter model, and zoom.

10. The system of claim 4, wherein the graphical user interface includes an expert configuration having options for a second order tune algorithm.

11. The system of claim 4, wherein the graphical user interface enables a user to program executable sets of control parameters that are available for automated sequencing during subsequent operations.

12. The system of claim 1, wherein the digital processor is adapted to switch from one set of control parameters to another set of control parameters in real-time in response to at least one of internal states and external commands.

13. The system of claim 1, wherein the digital processor is embedded in the digital controlled servo system.

14. A limited rotation motor optical scanning system comprising:
   a limited rotation motor scanner element adapted for directing an energy beam to at least one location within a field of view;
   a digital controlled servo system adapted for controlling motion of the limited rotation motor scanner element in accordance with a servo command waveform said command waveform including at least a first portion and a second portion;

a position feedback unit for providing a position feedback signal indicative of a rotational position of said limited rotation motor scanner element;

a wide angle compensation unit for receiving said position feedback signal and for providing a boost signal that is representative of a boost factor that compensates for torque constant variation with the rotational position of said limited rotation motor scanner element;

a digital processor for providing a first set of control parameters for use during the first portion of said command waveform in conformance with which said first portion of said command waveform will be employed to control motion of the limited rotation motor, and for providing a second set of control parameters for use during the second portion of said command waveform in conformance with which said second portion of said command waveform will be employed to control motion of the limited rotation motor; and an adjustment unit for providing a first adjusted output signal responsive to said first set of control parameters and responsive to said boost signal to control the motion of the limited rotation motor scanner element while compensating for torque constant variation with the rotational position of said limited rotation motor scanner element during the first portion of said command waveform, and for providing a second adjusted output signal responsive to said second set of control parameters and responsive to said boost signal to control the motion of the limited rotation motor scanner element while compensating for torque constant variation with the rotational position of said limited rotation motor scanner element during the second portion of said command waveform.

15. The system of claim 14, wherein each set of control parameters includes closed-loop control parameters.

16. The system of claim 15, wherein the digital processor is adapted to switch from one set of closed-loop control parameters to another set of closed-loop control parameters in real-time in response to at least one of internal states and external commands.

17. The system of claim 15, wherein the first set of closed-loop control parameters is for a first bandwidth application and the second set of closed-loop control parameters is for a second bandwidth application.

18. The system of claim 14, wherein the scanning system is employed in a laser marking application, and the first set of control parameters is used for marking and the second set of control parameters is used for jumps between marks.

19. The system of claim 14, wherein the scanning system is employed in a laser marking application, and the first set of control parameters is used for marking outlines and the second set of control parameters is used for filling outlines.

20. A method for laser marking using an optical scanning system including a servo controller and a limited rotation motor scanner element, the method comprising the steps of:

providing a set of control parameters for use during a scan period of a marking application; and providing a position feedback signal indicative of a rotational position of said limited rotation motor scanner element;

providing a boost signal responsive to said position feedback signal that is representative of a boost factor that compensates for torque constant variation with the rotational position of said limited rotation motor scanner element; and providing an adjusted output signal responsive to said control parameters and responsive to said boost signal to control the motion of the limited rotation motor scanner element while compensating for torque constant variation with the rotational position of said limited rotation motor scanner element during the command wavefom.

* * * * *

UNITED STATES PATENT AND TRADEMARK OFFICE
CERTIFICATE OF CORRECTION

PATENT NO. : 7,421,308 B2 Page 1 of 1
APPLICATION NO. : 11/627631
DATED : September 2, 2008
INVENTOR(S) : Michael Nussbaum et al.

It is certified that error appears in the above-identified patent and that said Letters Patent is hereby corrected as shown below:

In Claim 20, Col. 12, line 35, please delete "wavefom" and replace with --waveform--.

Signed and Sealed this

Seventh Day of October, 2008

JON W. DUDAS
*Director of the United States Patent and Trademark Office*